US011125313B2

(12) United States Patent
Teillet

(10) Patent No.: US 11,125,313 B2
(45) Date of Patent: *Sep. 21, 2021

(54) TRANSMISSION BOX, METHOD OF CLOSING SAME AND RUNNING VEHICLE EQUIPPED WITH SUCH A BOX

(71) Applicant: FRANCE REDUCTEURS, Les Herbiers (FR)

(72) Inventor: Emmanuel Teillet, Les Chatelliers Chateaumur (FR)

(73) Assignee: FRANCE REDUCTEURS, Les Herbiers (FR)

( * ) Notice: Subject to any disclaimer, the term of this patent is extended or adjusted under 35 U.S.C. 154(b) by 412 days.

This patent is subject to a terminal disclaimer.

(21) Appl. No.: 15/575,673

(22) PCT Filed: May 17, 2016

(86) PCT No.: PCT/FR2016/051153
§ 371 (c)(1),
(2) Date: Aug. 29, 2018

(87) PCT Pub. No.: WO2016/185126
PCT Pub. Date: Nov. 24, 2016

(65) Prior Publication Data
US 2018/0363756 A1 Dec. 20, 2018

(30) Foreign Application Priority Data

May 19, 2015 (FR) ..................................... 15 54463
May 19, 2015 (FR) ..................................... 15 54465
(Continued)

(51) Int. Cl.
*F16H 57/029* (2012.01)
*A01D 34/68* (2006.01)
(Continued)

(52) U.S. Cl.
CPC ....... *F16H 57/029* (2013.01); *A01D 34/6806* (2013.01); *A01D 34/6812* (2013.01);
(Continued)

(58) Field of Classification Search
CPC ..... F16H 57/029; F16H 1/10; A01D 34/6806; A01D 34/69; A01D 2034/6837; F16B 4/004; F16D 43/08; F16D 43/20
See application file for complete search history.

(56) References Cited

U.S. PATENT DOCUMENTS 6,196,367 B1 * 3/2001 Hanabusa .......... A01D 34/6806
192/3.54
9,759,300 B2 * 9/2017 Barendrecht ...... A01D 34/6812
(Continued)

FOREIGN PATENT DOCUMENTS

DE 4021669 A1 * 2/1992 ........... F16H 57/029
DE 102006036522 1/2008
(Continued)

OTHER PUBLICATIONS

Translation DE 4021669.*
Search Report dated Mar. 3, 2016.

*Primary Examiner* — Vicky A Johnson
(74) *Attorney, Agent, or Firm* — Ipsilon USA, LLP

(57) ABSTRACT

A transmission housing (2) of the type including two housing elements (9) that can be positioned to press against each other and that in the assembled-together state define: a cavity (13); a shaft (6) projecting at least in part from the housing (2); a motion transmission mechanism (30) for transmitting motion to said shaft (6), the motion transmission mechanism (30) being housed at least in part inside the cavity (13) of the housing (2); and sealing means (15) arranged in the zone where the housing elements (9) are pressed together and referred to as a join plane (10), the sealing means (15) surrounding said cavity (13).

(Continued)

The housing (2) comprises means (17) for connecting the housing elements (9) together by snap-fastening in order to hold the housing elements (9) pressed against each other and the sealing means (15) comprise adhesive connection means (16) for connecting said housing elements (9) together.

11 Claims, 15 Drawing Sheets

(30) Foreign Application Priority Data

| May 19, 2015 | (FR) | ...................................... 15 54467 |
| May 19, 2015 | (FR) | ...................................... 15 54470 |
| May 19, 2015 | (FR) | ...................................... 15 54471 |

(51) Int. Cl.
| *A01D 34/69* | (2006.01) |
| *F16B 4/00* | (2006.01) |
| *F16B 11/00* | (2006.01) |
| *F16D 43/08* | (2006.01) |
| *F16D 43/20* | (2006.01) |
| *F16D 67/02* | (2006.01) |
| *F16H 1/10* | (2006.01) |
| *F16H 1/20* | (2006.01) |
| *F16H 1/28* | (2006.01) |
| *F16H 37/04* | (2006.01) |
| *F16H 57/023* | (2012.01) |
| *A01D 101/00* | (2006.01) |
| *F16D 125/36* | (2012.01) |
| *F16D 125/48* | (2012.01) |
| *F16H 57/02* | (2012.01) |

(52) U.S. Cl.
CPC .............. *A01D 34/69* (2013.01); *F16B 4/004* (2013.01); *F16B 11/006* (2013.01); *F16D 43/08* (2013.01); *F16D 43/20* (2013.01); *F16D 67/02* (2013.01); *F16H 1/10* (2013.01); *F16H 1/20* (2013.01); *F16H 1/28* (2013.01); *F16H 37/041* (2013.01); *F16H 57/023* (2013.01); *A01D 2034/6837* (2013.01); *A01D 2101/00* (2013.01); *F16C 2310/00* (2013.01); *F16D 2125/36* (2013.01); *F16D 2125/48* (2013.01); *F16H 2057/02034* (2013.01)

(56) References Cited

U.S. PATENT DOCUMENTS

| 10,746,279 | B2 * | 8/2020 | Barendrecht | ........... A01D 34/69 |
| 2018/0119754 | A1 * | 5/2018 | Teillet | ................... F16H 37/041 |
| 2018/0299005 | A1 * | 10/2018 | Barendrecht | ............. F16H 1/28 |
| 2018/0363756 | A1 * | 12/2018 | Teillet | ................ A01D 34/6806 |

FOREIGN PATENT DOCUMENTS

| FR | 2995647 | 3/2014 |
| FR | 3004771 | 10/2014 |

\* cited by examiner

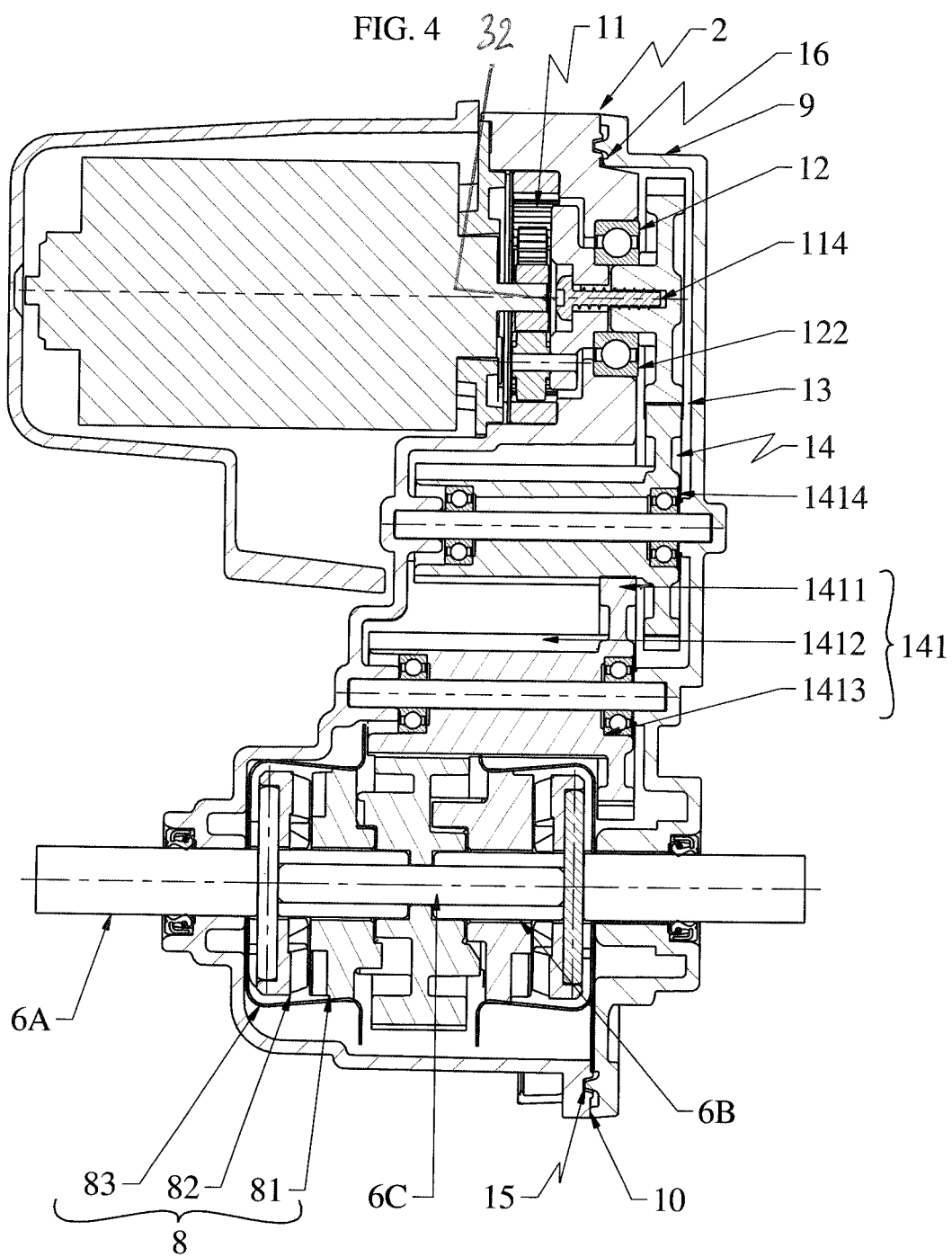

TRANSMISSION BOX, METHOD OF CLOSING SAME AND RUNNING VEHICLE EQUIPPED WITH SUCH A BOX

The invention relates to a housing for a transmission, to a method of closing the housing, and to a wheeled vehicle fitted with such a housing.

It relates more particularly to a transmission housing of the type including two housing elements that can be positioned to press against each other and that in the assembled-together state define: a cavity; a shaft projecting at least in part from the housing; a motion transmission mechanism for transmitting motion to said shaft, the motion transmission mechanism being housed at least in part inside the cavity of the housing; and sealing means arranged in the zone where the housing elements are pressed together and referred to as a join plane, the sealing means surrounding said cavity.

Housings for a transmission are well known to those skilled in the art. In order for the transmission mechanism to operate correctly, such a housing should contain a lubrication agent. It is therefore important for the housing to be closed in sealed manner.

Until now, and for the past few decades, such sealing has been obtained by inserting a gasket or adhesive on the join plane, then by screw-fastening the housing elements together, by means of a plurality of screws disposed at the join plane, around the cavity defined by the housing elements in the assembled-together state. That results in considerable assembly time, and requires a supply of screw-fasteners. Furthermore, during screw-fastening, the housing elements may slide against one another, which can sometimes cause adhesive to seep, when the sealing means are adhesive connection means.

It is also known to assemble housing elements by snap-fastening as shown in document US2013/220073. In that event, sealing is provided by means of a gasket.

An object of the invention is therefore to provide a transmission housing of the above-mentioned type and of a design that enables assembly of the housing elements to be simplified, and the cost of said housing to be reduced.

Another object of the invention is to provide a transmission housing of a design that makes it possible to reduce assembly time.

To this end, the invention provides a housing for a transmission of the type including two housing elements that can be positioned to press against each other and that in the assembled-together state define: a cavity; a shaft projecting at least in part from the housing; a motion transmission mechanism for transmitting motion to said shaft, the motion transmission mechanism being housed at least in part inside the cavity of the housing; and sealing means arranged in the zone where the housing elements are pressed together and referred to as a join plane, the sealing means surrounding said cavity, the housing being characterized in that it comprises means for connecting the housing elements together by snap-fastening in order to hold the housing elements pressed against each other and in that the sealing means comprise adhesive connection means for connecting said housing elements together. Replacing screws with a snap-fastener connection while retaining an adhesive connection results in a reduction in assembly time, and once snap-fastening has taken place, the adhesive can set without any need for the assembled-together housing elements to be held together manually for the time it takes for the adhesive to set.

Thus, the snap-fastener connection makes it possible for the operator to avoid any need for additional holding of the housing elements pressed against each other while the adhesive is setting.

In an embodiment, adhesive connection means include a channel referred to as the "main" channel for receiving adhesive, which main channel is peripheral, surrounding said cavity and being arranged between two "auxiliary" channels each running parallel to the main channel in the assembled-together state of said housing elements. This arrangement makes it necessary for the adhesive received in the main channel to cross another channel before it can reach either the outside or the inside of the housing. Adhesive is thus prevented from seeping to the outside or to the inside of the housing. Thus, the mechanics housed inside the housing are protected from any contact with the adhesive.

In an embodiment, the adhesive connection means include a channel referred to as the "main" channel for receiving adhesive surrounding said cavity, and at least one "auxiliary" channel running parallel to the main channel in the assembled-together state of said housing elements. This auxiliary channel that is suitable for recovering excess adhesive from the main channel may run parallel to the main channel internally or externally.

In an embodiment said peripheral main channel comprises a female element, such as a groove, carried by one housing element and a male element such as a rib, carried by the other housing element, with the male element being engaged at least in part in the female element in the assembled-together state of said housing elements. Providing a main channel in the form of a male element co-operating with a female element makes it possible, in simple manner, to increase the area of the adhesive bonding, without harming its quality.

In addition, the sealing means may comprise a gasket placed at the join plane in at least one of the housing elements.

Preferably, the means for connecting the housing elements together by snap-fastening comprise a plurality of elastically deformable members extending over the periphery of one of the housing elements, said elastically deformable members being suitable for co-operating by coming to engage with complementary members carried by the other housing element when the housing elements are pressed against each other. These means for connecting the housing elements together by snap-fastening are preferably made integrally with said housing elements.

Preferably, the means for connecting the housing elements together by snap-fastening comprise a plurality of recesses in the form of loops arranged around the periphery of one of the housing elements in order to form said plurality of elastically deformable members and a plurality of lugs arranged around the periphery of the other housing element in order to form said complementary members, each lug being suitable for being inserted in a loop when the housing elements are pressed against each other.

Preferably, the housing is a transmission housing of a wheeled vehicle and the shaft that projects at least in part from the housing is a wheel drive shaft for driving the wheels of a single pair of wheels of the vehicle, the wheel drive shaft being made as a single part, or else as at least two wheel drive shaft sections on a common axis, each suitable for driving a respective wheel of a single pair of wheels of the vehicle, the drive shaft extending transversely, preferably orthogonally, to said join plane when the two housing elements are in the assembled-together state.

Preferably, the mechanism for transmitting motion to said wheel drive shaft comprises: motor drive means, comprising a motor having a driven motor shaft preferably extending parallel to the longitudinal axis of the wheel drive shaft; a rotary driven member, such as a toothed wheel, that is permanently engaged with the motor drive means for rotating said driven member, and arranged between the wheel drive shaft or each of the wheel drive shaft sections of said shaft and the driven member; a clutch mechanism, the or each clutch mechanism being activated by driving the driven member in rotation in a first rotary drive direction referred to as the "forward" direction, and being deactivatable by driving the shaft or the wheel drive shaft section with which it co-operates in rotation in the forward direction when the speed of rotation of the shaft or of said wheel drive shaft section is greater than the speed of rotation of the driven member; the wheel drive shaft or each wheel drive shaft section being, in the deactivated state of the corresponding clutch mechanism, free to rotate in either direction of rotation.

The invention also provides a method of closing a transmission housing including two housing elements that can be positioned to press against each other and that in the assembled-together state define: a cavity; a shaft projecting at least in part from the housing; a motion transmission mechanism for transmitting motion to said shaft, the motion transmission mechanism being housed at least in part inside the cavity of the housing; and sealing means extending in the zone where the housing elements are pressed together and referred to as a join plane, the sealing means surrounding said cavity, the method being characterized in that the sealing means comprise adhesive connection means, and said method comprises a step of placing adhesive on the join plane of at least one of the housing elements, a step of applying said housing elements against each other, and a step of holding said housing elements pressed against each other by means of snap-fastening connection means fitted on said housing elements so as to hold the housing elements pressed against each other until the adhesive has set.

The invention also provides a wheeled vehicle fitted with a transmission housing, the vehicle being characterized in that the transmission housing is of the above-described type.

The invention can be better understood on reading the following description of embodiments given with reference to the accompanying drawings, in which:

FIG. 4 is a section view of a transmission in accordance with the invention, with the shaft being made up of two shaft sections.

As mentioned above, the transmission housing 2 forming the object of the invention is more particularly intended to be mounted on a wheeled vehicle 1, in particular a vehicle requiring a walking driver.

Figure 1:
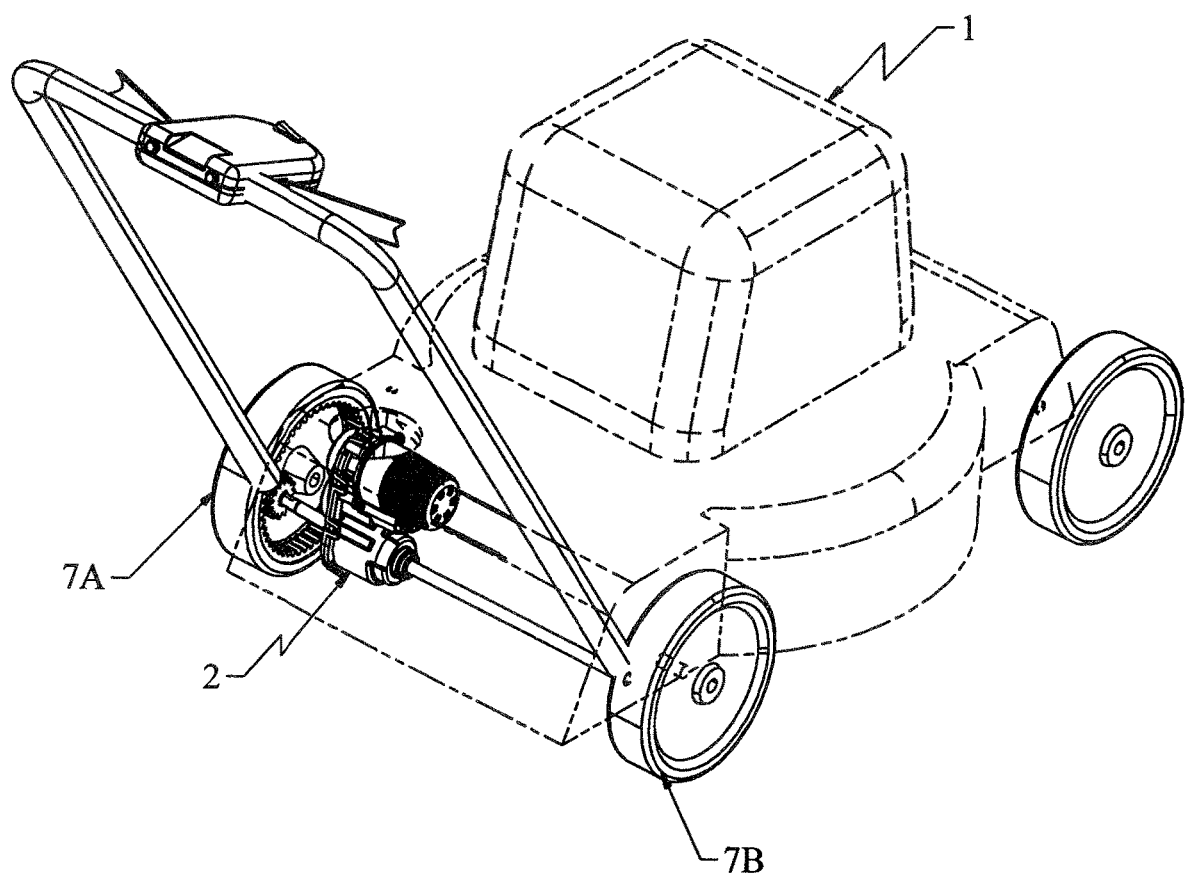
FIG. 1 is an overall view of a wheeled vehicle fitted with a transmission housing in accordance with the invention.
Figure 2:
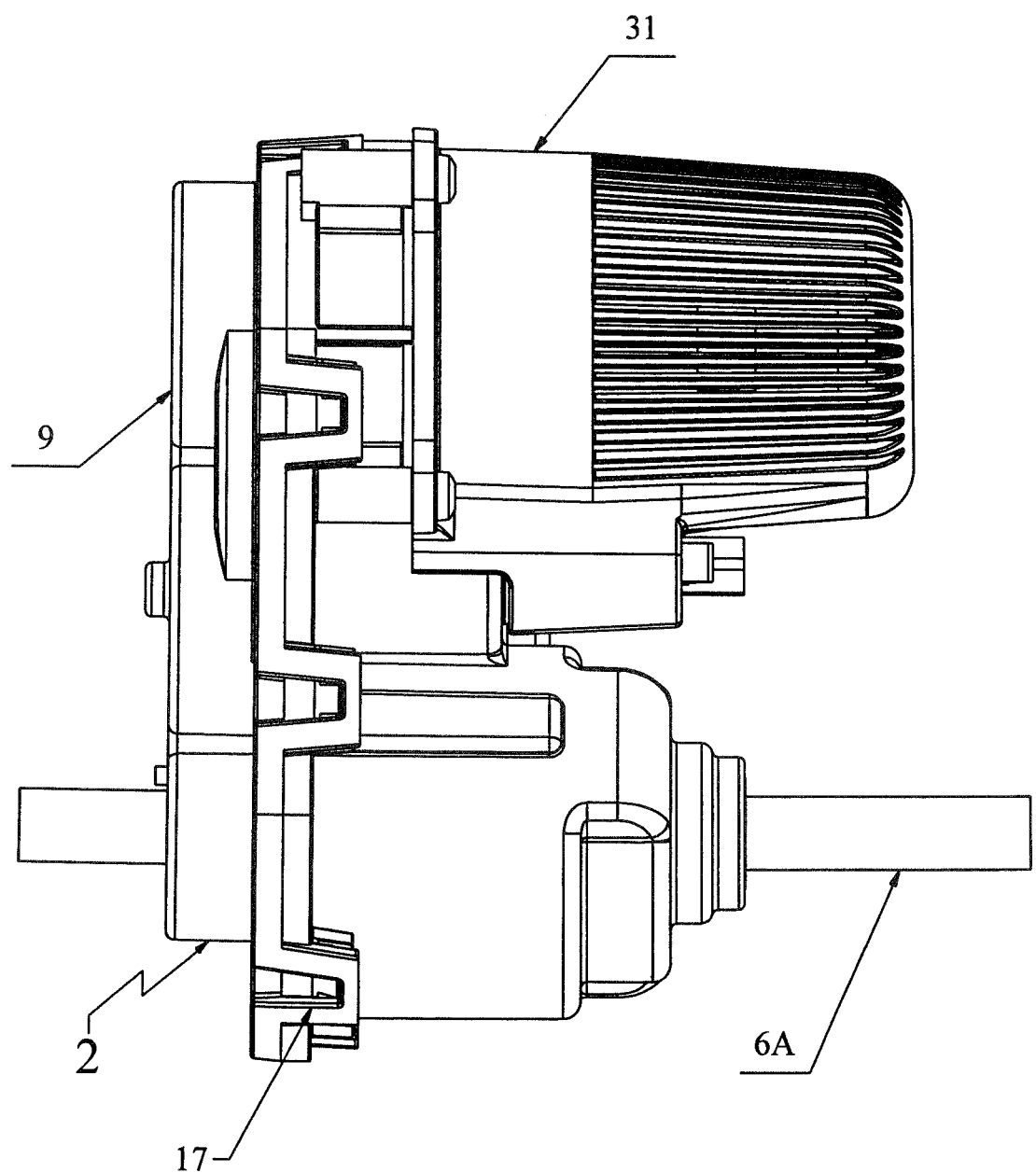
FIG. 2 is a perspective view of a transmission housing in accordance with the invention.

FIG. 1 shows the application of such a transmission housing on a lawn mower. The lawn mower comprises a wheeled chassis, the rear wheels of the chassis being referenced 7A and 7B in the figures.

The stationary transmission housing 2 is carried by said wheeled chassis of the vehicle. The transmission housing 2, preferably made of synthetic material, is formed of two elements 9 or half-shells that are assembled together by a join plane 10. These housing elements 9 are therefore generally molded parts, made by injection molding. Inside a cavity 13 defined by said housing elements, the transmission housing 2 houses at least part of a shaft 6, which in this example forms a wheel drive shaft 7A, 7B of the vehicle, together with a transmission mechanism 30 for transmitting motion to said shaft.

The transmission mechanism 30 is described in more detail below.

The transmission housing 2 further comprises sealing means 15 arranged in the zone where the housing elements are pressed together, this zone where they are pressed together being referred to as a join plane 10. The sealing means 15 surround said cavity 13.

Figure 9:
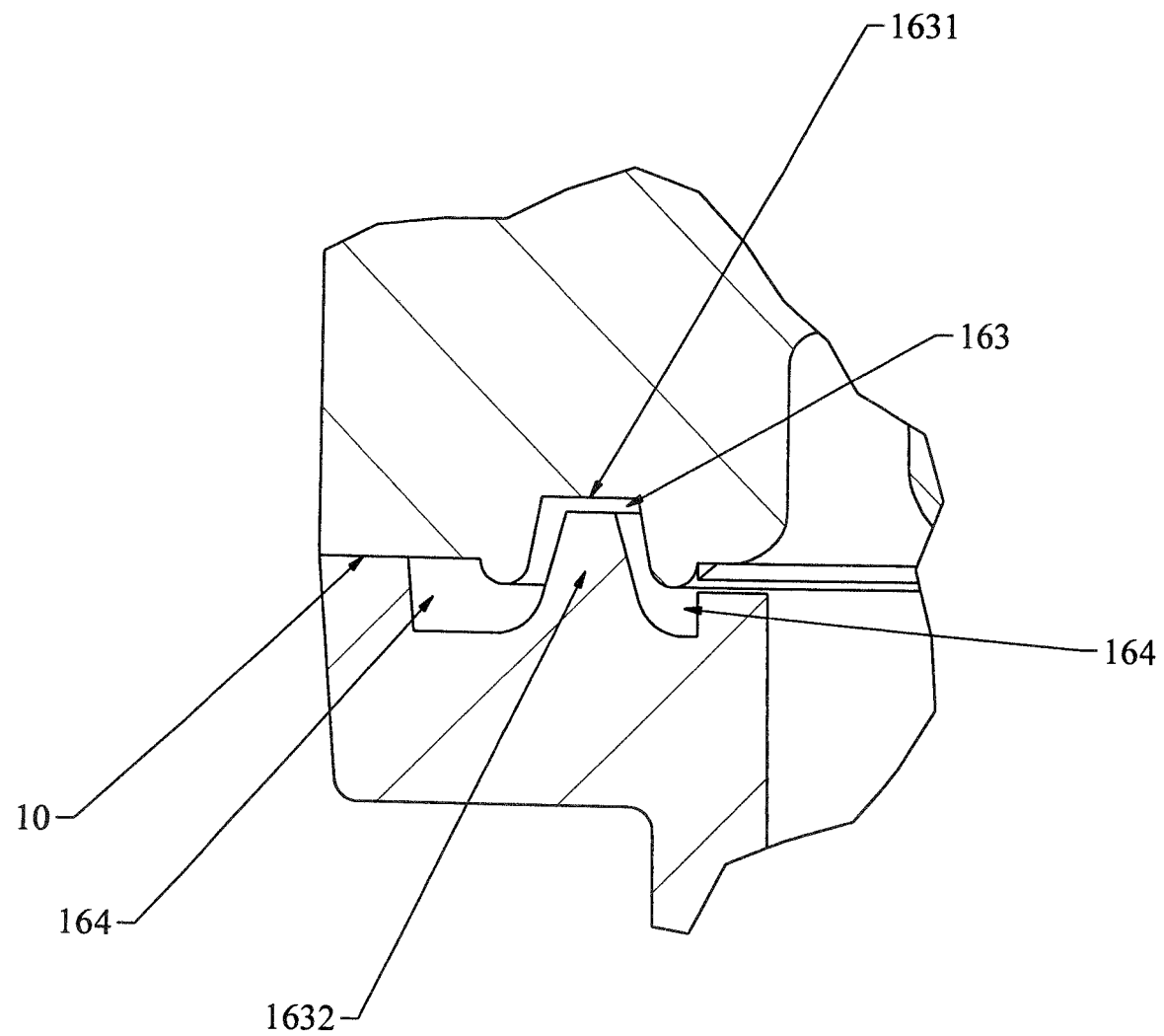
FIG. 9 is a detail view of an embodiment of adhesive connection means.
Figure 10:
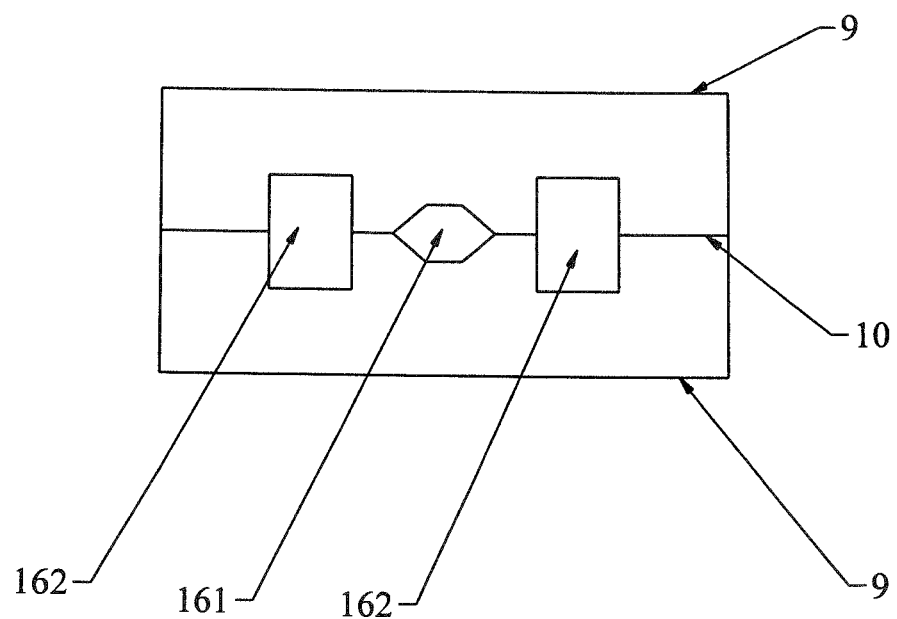
FIG. 10 is a detail view of another embodiment of adhesive connection means.
Figure 11:
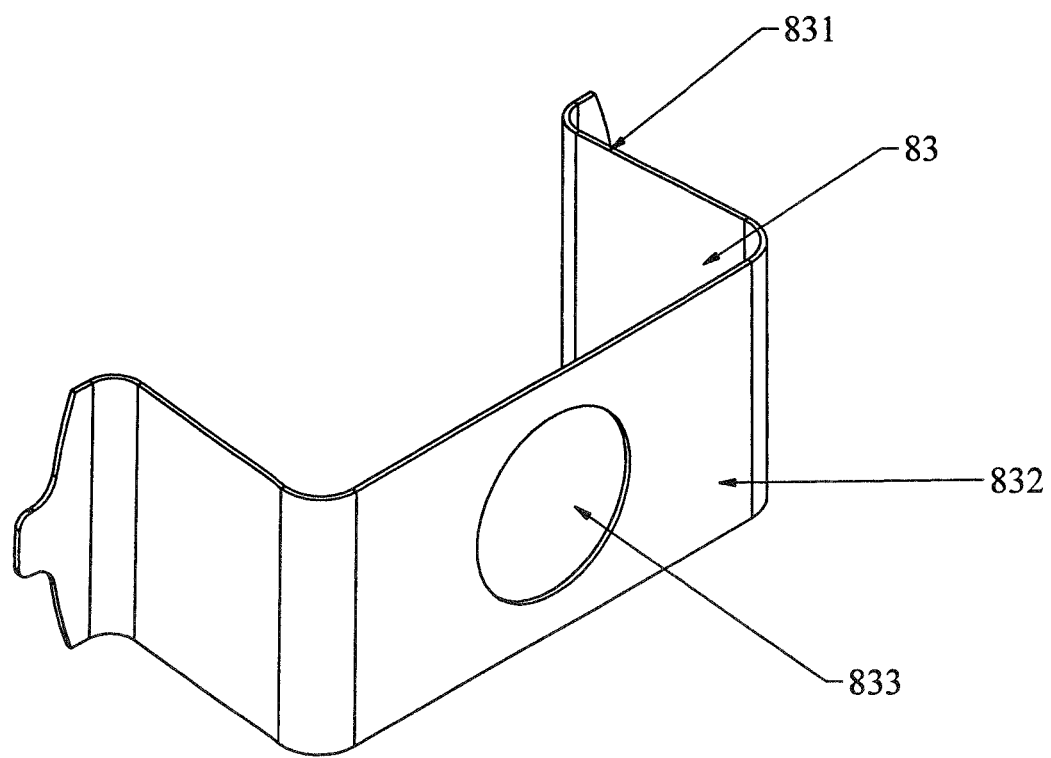
FIG. 11 is a perspective view of a brake.
Figure 12:
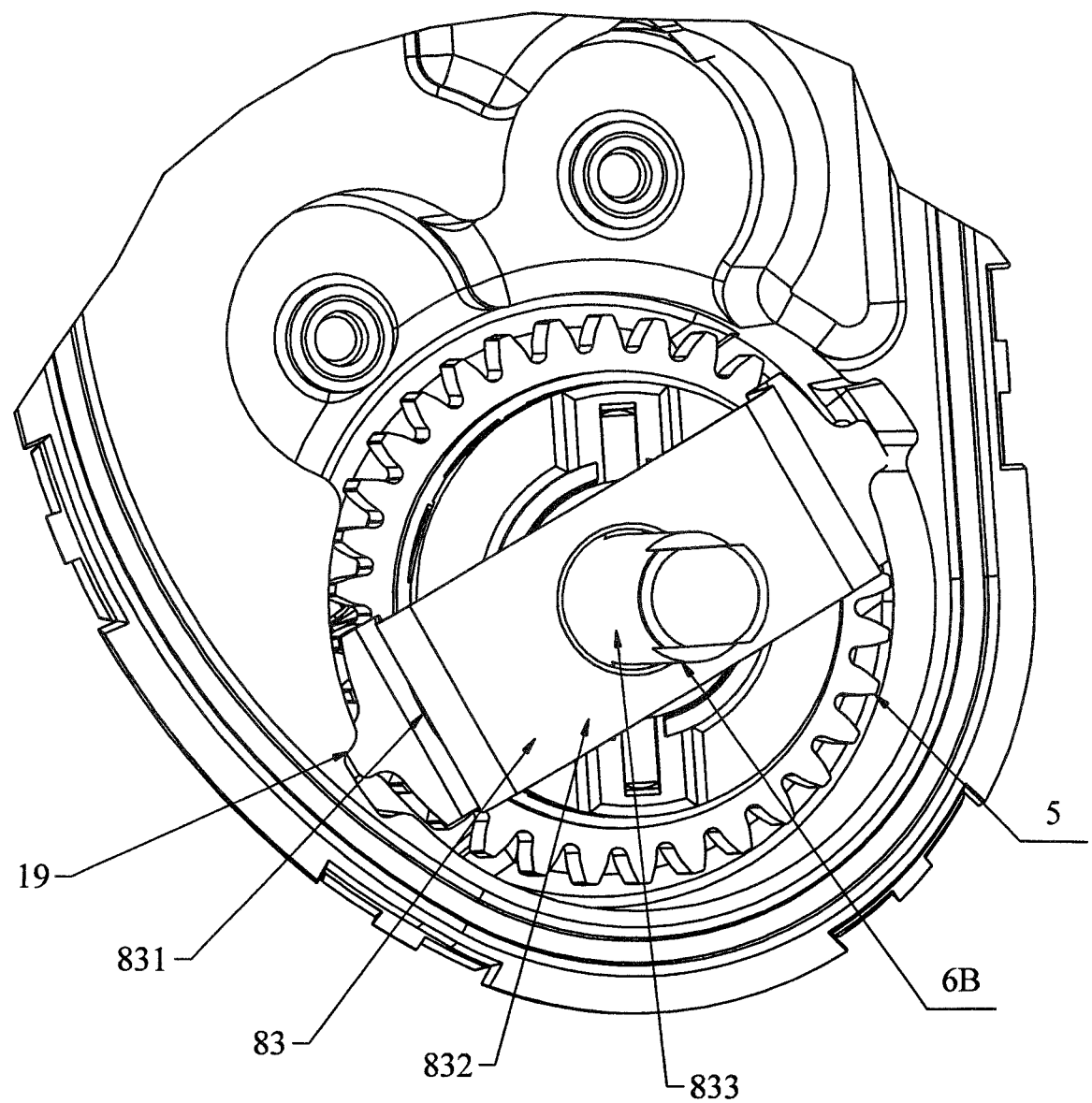
FIG. 12 is a detail view of a brake in position on the shaft.
Figure 13:
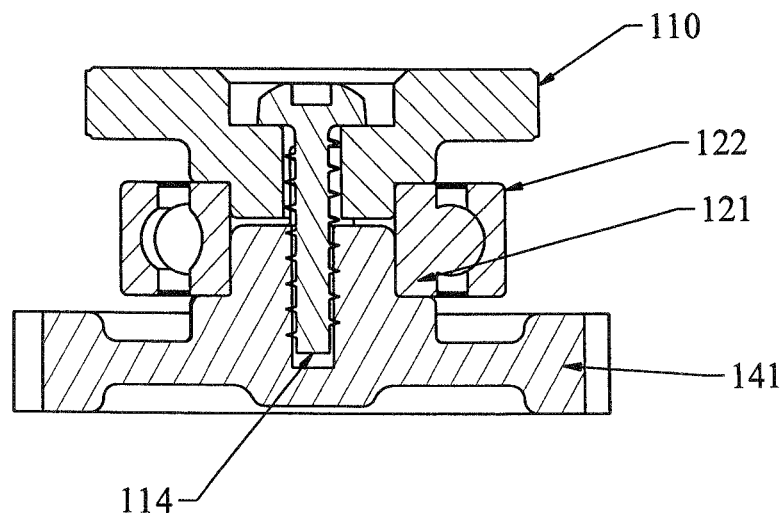
FIG. 13 is a section view of the connection between an epicyclic gear train and a clutch mechanism.
Figure 14:
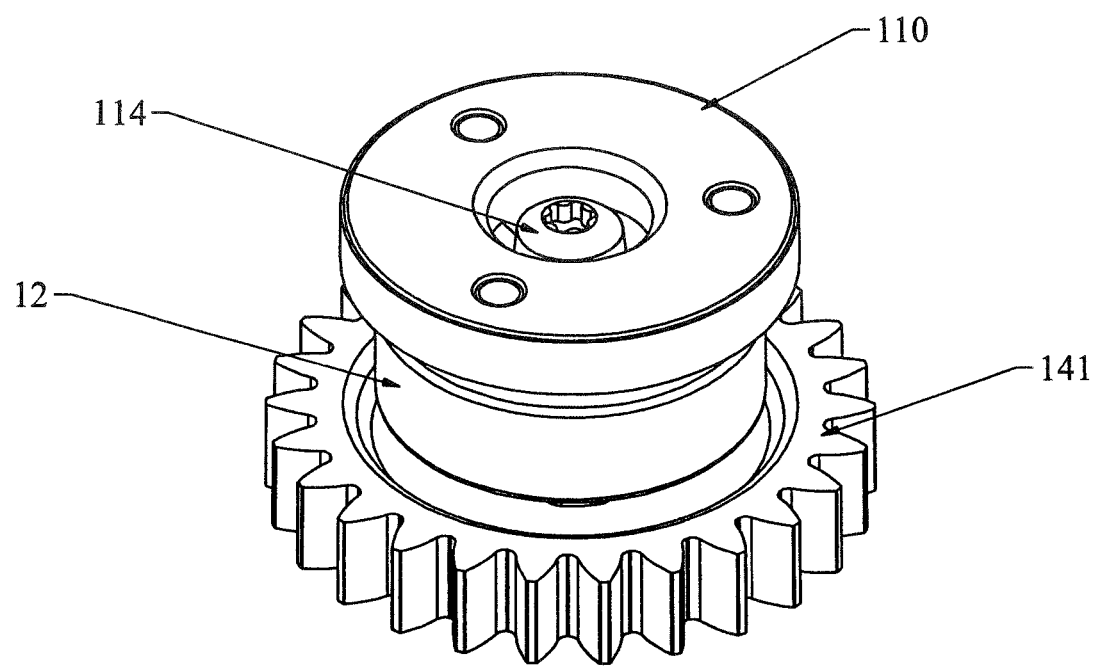
FIG. 14 is a perspective view of FIG. 13.
Figure 15:
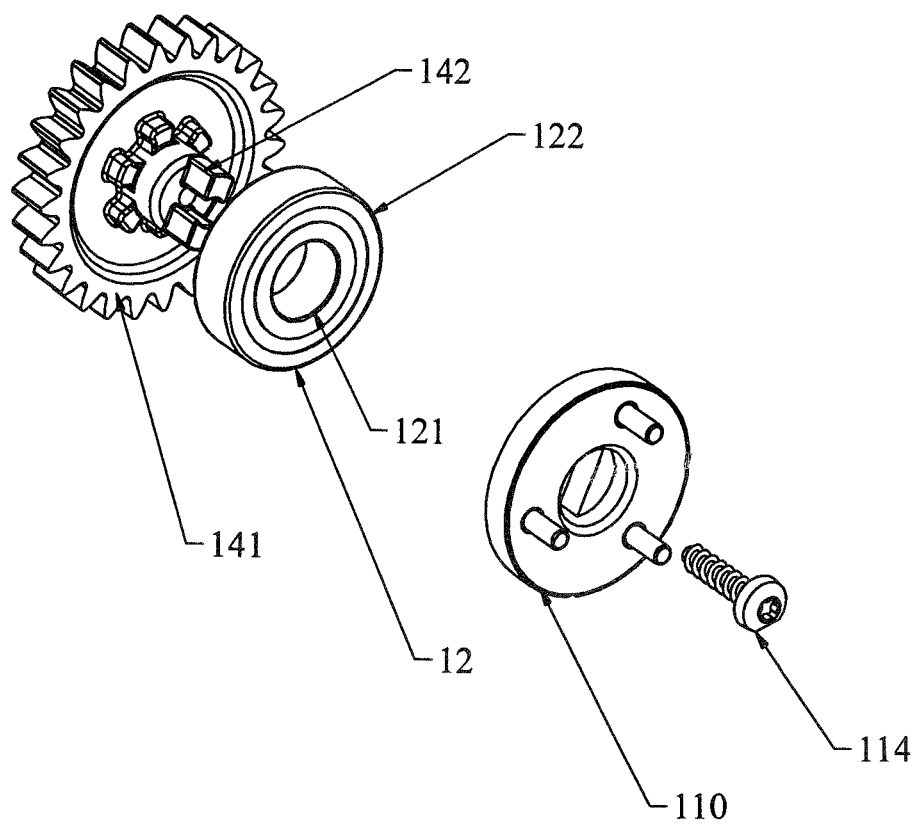
FIG. 15 is a view in the exploded position of elements constituting the connection between an epicyclic gear train and a clutch mechanism.
Figure 16:
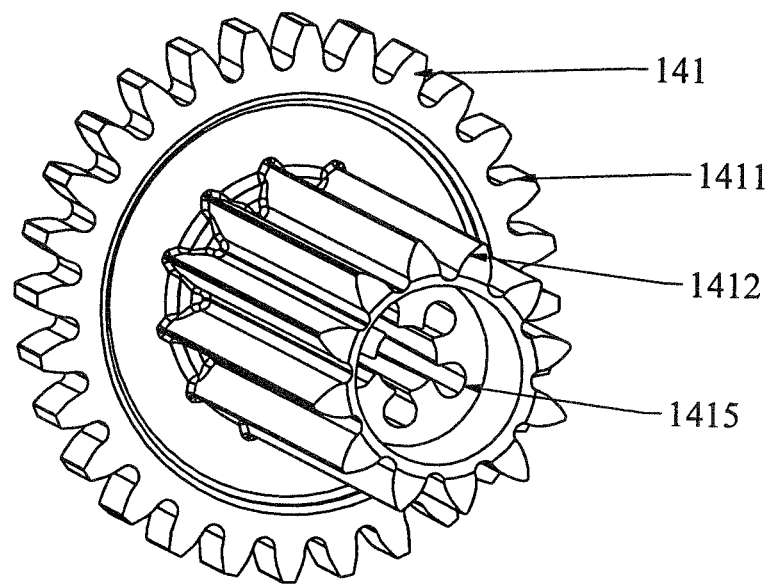
FIG. 16 is a perspective view of a double gear.
Figure 17:
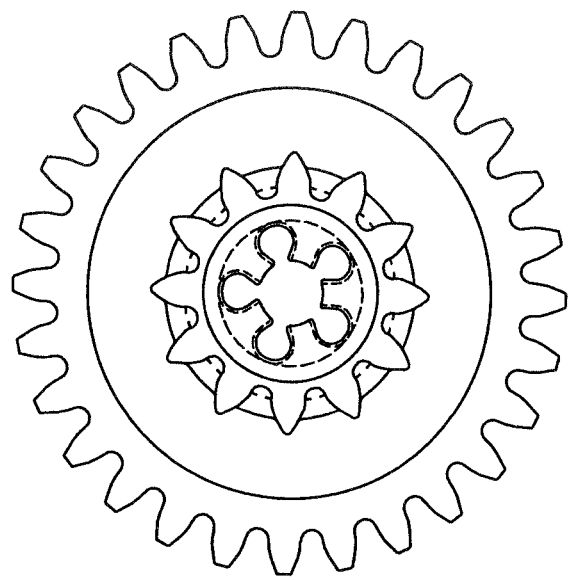
FIG. 17 is a view seen from one end of a double gear.

In the example shown in FIGS. 9 and 10, the sealing means 15 comprise adhesive connection means 16 for connecting said housing elements 9 together.

In the example shown in FIG. 10, the adhesive connection mean 16 include a "main" or "central" channel 161 for receiving adhesive.

This peripheral main or central channel 161 surrounds the cavity 13 and is arranged between two "auxiliary" channels 162, each running parallel to the main channel 161 when said housing elements 9 are in the assembled-together state. In this embodiment, each channel is formed by two facing grooves, each made in a respective housing element. As mentioned above, the two auxiliary channels 162 make it possible to collect excess adhesive deposited in the main or central channel 161.

In the example shown in FIG. 9, the adhesive connection means 16 include a "main" channel 163 for receiving adhesive, surrounding said cavity 13, together with at least two auxiliary channels 164 running parallel to the main channel 163, one towards the outside of the housing, the other towards the inside of the housing, when said housing elements are in the assembled-together state.

Naturally, in a variant, provision could be made to have only one auxiliary channel extending over one side only of the main channel.

In the embodiment in FIG. 9, the peripheral main channel 163 comprises a female element 1631 formed by a groove, carried by one housing element 9 and a male element 1632 formed by a rib, carried by the other housing element. The male element 1632 nests at least in part in the female element 1631, when said housing elements 9 are in the assembled-together state.

Each auxiliary channel is simply formed by a groove made in one of the housing elements. In addition, the sealing means 15 may comprise a gasket 23 placed in a channel made at the join plane 10 in at least one of the housing elements 9.

In a manner characteristic of the invention, the housing 2 further comprises means 17 for connecting the housing elements 9 together by snap-fastening, in order to hold the housing elements 9 pressed against each other.

Because the housing elements are pressed against each other automatically and immediately, the snap-fastener connection means 17 allow the operator to install said housing as soon as it has been closed, without needing to wait until the adhesive that is required for connecting said housing elements 9 together has set. This results in an additional saving of time.

The means 17 for connecting the housing elements 9 together by snap-fastening comprise a plurality of elastically deformable members 171 extending around the periphery of one of the housing elements 9, said elastically deformable members 171 being suitable for co-operating with the complementary members 172 carried by the other housing element 9 by engaging therewith when the housing elements 9 are pressed against each other.

Figure 6:
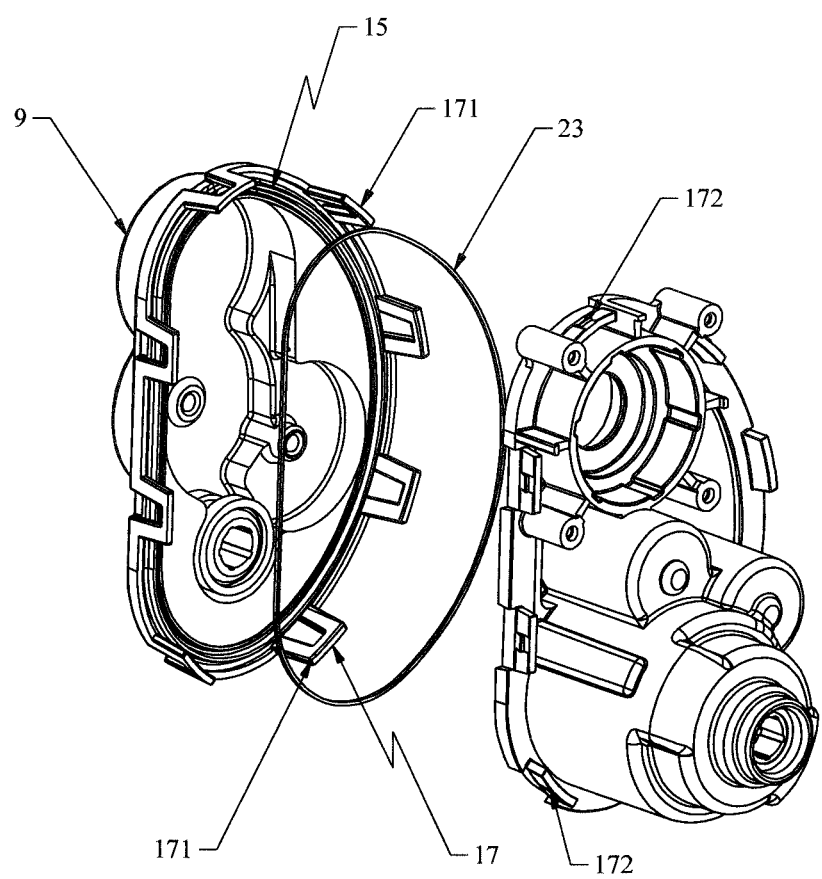
FIG. 6 is a perspective view of housing elements in the non-assembled-together state.
Figure 7:
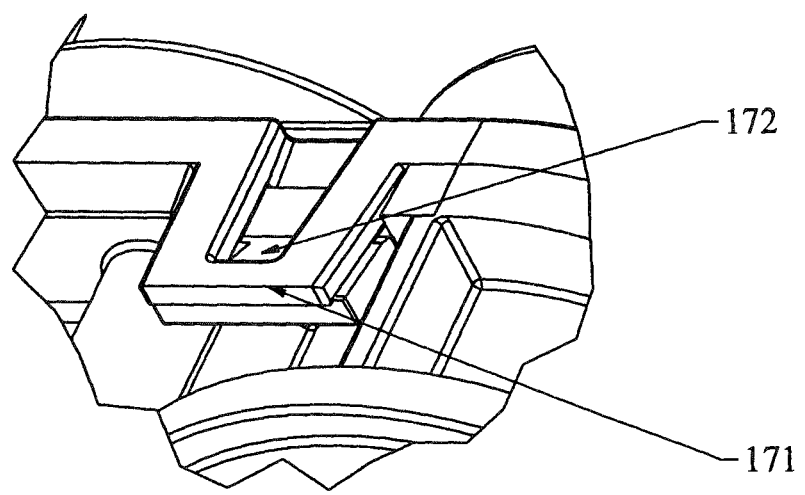
FIGS. 7 and 8 are detail views showing snap-fastener holder means.
Figure 8:
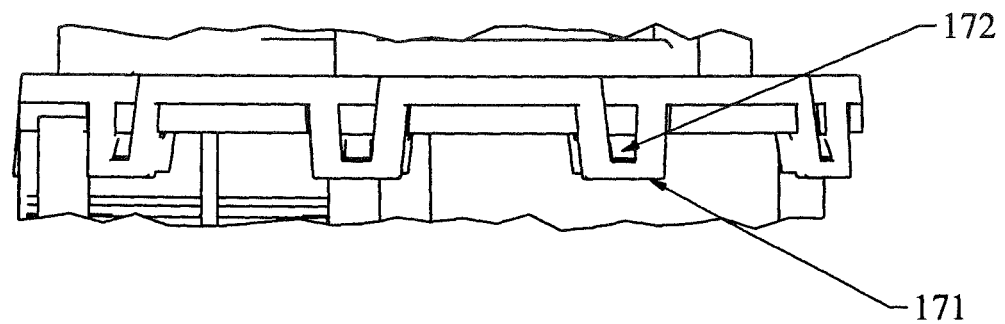

In the example shown in FIGS. 6 to 8, the means 17 for connecting the housing elements 9 together by snap-fastening comprise a plurality of recesses 171 in the form of loops arranged around the periphery of one of the housing elements 9 in order to form said plurality of elastically deformable members 171 and by a plurality of lugs 172 or catches arranged around the periphery of the other housing element 9 in order to form said complementary members 172, each lug 172 being suitable for being inserted in a loop 171 when the housing elements 9 are pressed against each other.

Thus, when the housing elements are brought together and the housing elements are being positioned to press against each other, each loop of one of the housing elements tends, by bearing and sliding contact against a lug or catch of the other housing element, to splay out from said lug or catch until said lug or catch has gone past the end of the loop.

Once the end of the loop has gone past the lug or catch, the loop tightens around the lug or catch, and surrounds the lug or catch in order to hold said housing elements pressed against each other.

Separating the housing element by moving said housing elements apart requires the loops to be deformed so as to enable the lugs to exit from said loops. The simplicity of the snap-fastening assembly and its speed of implementation thus enable the housing elements to be positioned immediately to press against each other, and enable said position to be maintained as soon as adhesive has been put into place at the join plane of at least one of the housing elements 9, said adhesive being placed in the main channel.

This therefore results in a method of closing the housing, which merely comprises a step of placing adhesive on the join plane 10 of at least one of the housing elements 9, a step of applying said housing elements 9 against each other, and a step of holding said housing elements 9 pressed against each other by means of the snap-fastening connection means 17 fitted on said housing elements.

As mentioned above, the housing 2 is a transmission housing for a wheeled vehicle 1, and the shaft 6 that projects at least in part from the housing 2 is a wheel drive shaft for driving the wheels 7A, 7B of a single pair of wheels of the vehicle. This wheel drive shaft 6, made either as a single part, or else as at least two wheel drive shaft sections 6A, 6B on a common axis, each section being suitable for driving a respective wheel 7A, 7B of a single pair of wheels of the vehicle, the drive shaft extends transversely, preferably orthogonally, to said join plane 10 when the two housing elements 9 are in the assembled-together state.

The mechanism 30 for transmitting motion to said wheel drive shaft 6 comprises: motor drive means 3 comprising a motor 31 having a driven motor shaft 32 preferably extending parallel to a longitudinal axis of the wheel drive shaft 6; a rotary driven member 5, specifically a toothed wheel, that is permanently engaged with the motor drive means 3 for rotating said driven member 5, and arranged between the wheel drive shaft 6 or each of the wheel drive shaft sections 6A, 6B of said shaft 6 and the driven member 5; and a clutch mechanism 8. The or each clutch mechanism 8 is activated by turning the driven member 5 in a first rotary drive direction referred to as the "forward" direction, and being deactivatable by driving the shaft 6 or the wheel drive shaft section 6A, 6B with which it co-operates in rotation in the forward direction, when the speed of rotation of the shaft 6 or of said wheel drive shaft section 6A, 6B is greater than the speed of rotation of the driven member 5. The wheel drive shaft 6 or each wheel drive shaft section 6A, 6B is, in the deactivated state of the corresponding clutch mechanism 8, free to rotate in either direction of rotation.

The motor drive means 3 further comprise both a clutch mechanism 14 that is arranged between the drive shaft 32 and the toothed wheel 5 and that is permanently engaged with said toothed wheel 5, and also an epicyclic gear train between the drive shaft 32 and the clutch mechanism 14, these elements enabling the rotary motion of the drive shaft 32 to be transmitted to said toothed wheel 5.

It should be observed that the drive shaft 32 may be driven in rotation in one direction or else in two opposite directions.

The clutch mechanism 14 arranged between the drive shaft 32 and the toothed wheel 5 and with which the toothed wheel 5 is permanently engaged by meshing, comprises a plurality of gears 141, each mounted to rotate about an axis extending parallel to the drive shaft 32 and to the wheel drive shaft 6, or each of the wheel drive shaft sections 6A, 6B.

This plurality of gears 141 includes a gear 141 constrained to rotate with the planet carrier 110 of the epicyclic gear train as described below together with two double gears 141, each comprising two sets of teeth 1411, 1412 of different diameters. Said double gears 141 are identical from one gear to the other.

Each double gear 141 is carried by a support shaft 142 that extends between two housing elements. Said support shafts 142 are identical from one double gear 141 to another, for simplifying fabrication.

Each double gear 141 comprises a toothed wheel 1411 suitable for forming the first set of teeth of the gear 141 and a splined tube 1412 suitable for forming the second set of teeth of the gear, which wheel and tube are constrained to rotate together about a common axis, said double gears 141 being axially offset to allow said double gear 141, referred to as the "downstream" gear, in meshing engagement with the driven member 5 to engage via its toothed wheel 1411 with the splined tube 1412 of the double gear 141, referred to as the "upstream" gear, that, relative to the downstream gear, is positioned closer to the drive shaft 32.

Inside its toothed wheel 1411, each double gear 141 has an annular housing 1413, and a bearing member 1414 is housed in the "upstream" double gear 141 that is positioned closer to the drive shaft 32.

The upstream double gear 141 engages the gear 141 that is constrained to rotate with the planet carrier 110 of the epicyclic gear train 11, as described below.

Each double gear 141 is provided internally with at least one longitudinal groove 1415, specifically five longitudinal grooves in this example. Each groove 1415 is suitable for forming a supply of lubricant. Each longitudinal groove presents a petal-shaped curved profile from one end of said groove.

The epicyclic gear train 11 arranged between the clutch mechanism 14 and the drive shaft 32 comprises: an inner sunwheel 111 constrained to rotate with the drive shaft 32; an outer ring 112 fastened to the housing 2; planets 113 engaged by meshing with the sunwheel and the ring; and a planet carrier 110 to which the rotary motion of the drive shaft 32 is transmitted via the epicyclic gear train 11.

The planet carrier 110 together with the gear 141 of the clutch mechanism forms a rotary assembly that is carried and guided in rotation inside the housing by a rolling bearing 12.

The bearing 12 comprises an inner ring 121 inside which said assembly is received at least in part, and an outer ring 122 surrounding the inner ring 121.

The inner and outer rings are coaxial rings that are mounted to be free to rotate relative to each other. The ring 122 is held stationary inside the housing 2.

Rolling members such as balls, needles, etc., are arranged between the inner and outer rings to allow the rings to rotate freely relative to each other. For mounting purposes, the inner ring of the bearing is constrained to rotate with the planet carrier 110 and the gear 141, sandwiched between the planet carrier 110 and the gear 141.

For this purpose, the planet carrier 110 and the gear 141 each present an inner portion inside the inner ring of the bearing, being inserted inside the ring, an outer portion outside the inner ring of the bearing, and a shoulder at the interface between the inner and outer portions.

The inner ring 121 of the bearing 12, which has an inner circumferential face, an outer circumferential face, and two side faces connecting the circumferential faces together, is sandwiched between the planet carrier 110 and the gear 141 via its side faces, which side faces are clamped between the shoulders of the planet carrier 110 and the gear 141.

In addition, in order to be constrained to rotate together, the planet carrier 110 and the gear 141 are connected together by a connection member, specifically a screw 114, and they present geometrical shapes that are complementary.

Driving the inner sunwheel in rotation drives rotation of the planets 113 engaged therewith by meshing with the inner circumferential teeth of the outer ring 112. Since this ring is a stationary ring secured to the housing, the planets 113, each of which is threaded on a respective planet carrier shaft, tend to drive rotation of the planet carrier 110, which itself drives rotation of the gear 141 to which it is secured.

This rotary motion is transmitted by the clutch mechanism 14 to the toothed wheel 5, which is mounted to rotate freely on the wheel drive shaft 6 of the vehicle.

Figure 5:
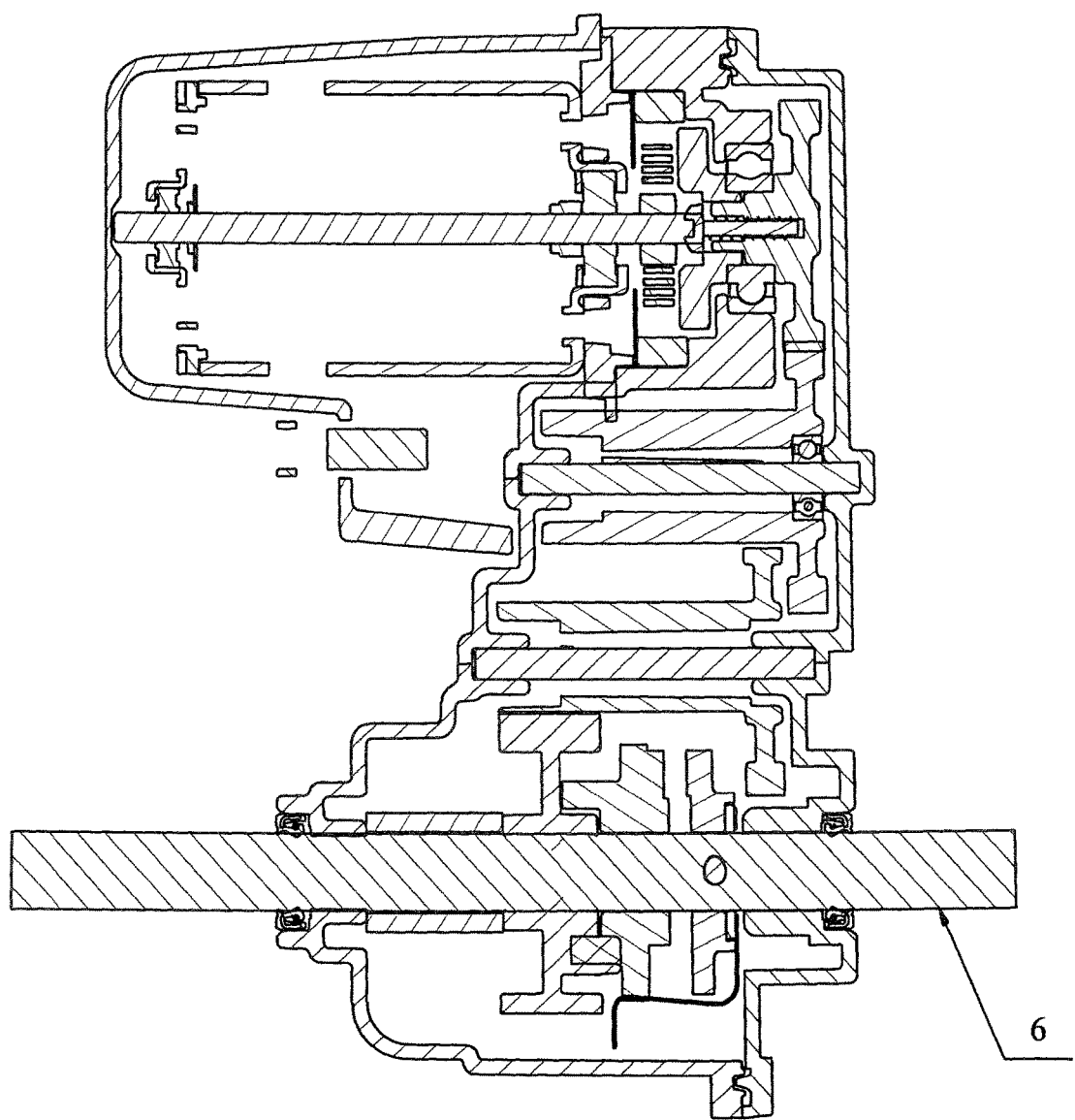
FIG. 5 is a section view of a transmission housing in accordance with the invention, with the shaft made as a single piece.

The wheel drive shaft of the vehicle may be made as a single part, as shown in FIG. 5, or else in the form of two shaft sections 6A, 6B on a common axis, each section being suitable for driving a wheel 7A, 7B of a single pair of wheels of the vehicle, as shown in FIG. 4.

When there are two shaft sections 6A and 6B, they are held in alignment by a connection pin 6C on which they are engaged, the shaft sections 6A, 6B being suitable, in the aligned state, for moving relative to each other in rotation.

It should be observed that the longitudinal axis of the wheel drive shaft 6 or the longitudinal axis of each of the wheel drive shaft sections 6A, 6B extends parallel to the drive shaft 32 of the motor drive means 3 for driving the toothed wheel 5 in rotation.

The two solutions for making the above-described wheel drive shaft differ merely by the number of clutch mechanisms necessary at said shaft, but their operation is similar.

Therefore, there is described herein only an operation with one shaft in the form of two shaft sections 6A, 6B, each shaft section being fitted with a respective clutch mechanism 8.

Each clutch mechanism 8 is an automatic clutch activated by driving the toothed wheel 5 in rotation in a first rotary drive direction referred to as the "forward" direction, and being deactivatable by driving the wheel drive shaft section 6A, 6B with which it co-operates in rotation in the forward direction when the speed of rotation of said wheel drive shaft section 6A, 6B is greater than the speed of rotation of the toothed wheel 5.

In the deactivated state of the corresponding clutch mechanism 8, this wheel drive section 6A, 6B is free to rotate in either direction of rotation.

One of these clutch mechanisms is suitable for transmitting the motion of the toothed wheel 5 to the wheel drive shaft section 6A and the other clutch mechanism is suitable for transmitting the motion of the toothed wheel 5 to the wheel drive shaft section 6B.

Thus, the toothed wheel 5 arranged coaxially about the wheel drive shaft sections is arranged between the two clutch mechanisms 8, each clutch mechanism 8 being carried by a wheel drive shaft section.

Each clutch mechanism 8 comprises a clutch plate 81 mounted to rotate freely on the associated wheel drive shaft 6 or wheel drive shaft section 6A, 6B; a part 82 that is carried by and constrained to rotate with the associated wheel drive shaft 6 or wheel drive shaft section 6A, 6B; and a brake 83 of said clutch plate 81 that acts continuously on the angular speed of said plate 81. Said clutch plate 81, to which the rotary motion of the driven member 5 is suitable for being transmitted is mounted to be axially movable towards and away from the driven member 5 and is arranged: in the activated state, away from the driven member 5 and engaged with the part 82 that is carried by, and constrained to rotate with, the shaft 6 or the wheel drive shaft sections 6A; 6B; and, in the deactivated state, towards said member 5 and decoupled from the part 82 that is carried by, and constrained to rotate with, the shaft 6 or the wheel drive shaft section 6A, 6B; and said brake 83 is threaded on the wheel drive shaft 6 or the wheel drive shaft section 6A, 6B associated with said plate 81.

In the activated state, the clutch plate 81 is thus arranged away from the toothed wheel 5, i.e. spaced apart from the toothed wheel 5 by a distance that is greater than the distance between the clutch plate and the toothed wheel 5 in the deactivated state.

In order to enable activation and deactivation of the clutch means, the clutch plate 81 and the part 82 of each clutch mechanism, and the toothed wheel 5 are provided with ramps on at least one of their faces.

During the activation stage, the ramps 18 of one of the faces of the plate 81 co-operate with ramps 20 of one of the faces of the toothed wheel 5 in order to move the clutch plate 81 axially in a first direction away from the toothed wheel 5 so as to secure the clutch plate 81 with the part 82 that is carried by and constrained to rotate with the wheel drive shaft section 6A, 6B that co-operates with the clutch mechanism.

During the deactivation phase, the ramps 21 of the other face of the plate 81 co-operate, with ramps 22 of the part 82 carried by and constrained to rotate with the wheel drive shaft section 6A, 6B, to cause freewheeling of the wheel drive shaft section 6A, 6B with which the clutch mechanism is suitable for co-operating, by axially moving said clutch plate 81 in the opposite direction.

The ramps of the toothed wheel 5 and of the clutch plate 81 in this example are formed by one of the flanks of fluting or teeth projecting from said faces.

Figure 3A:
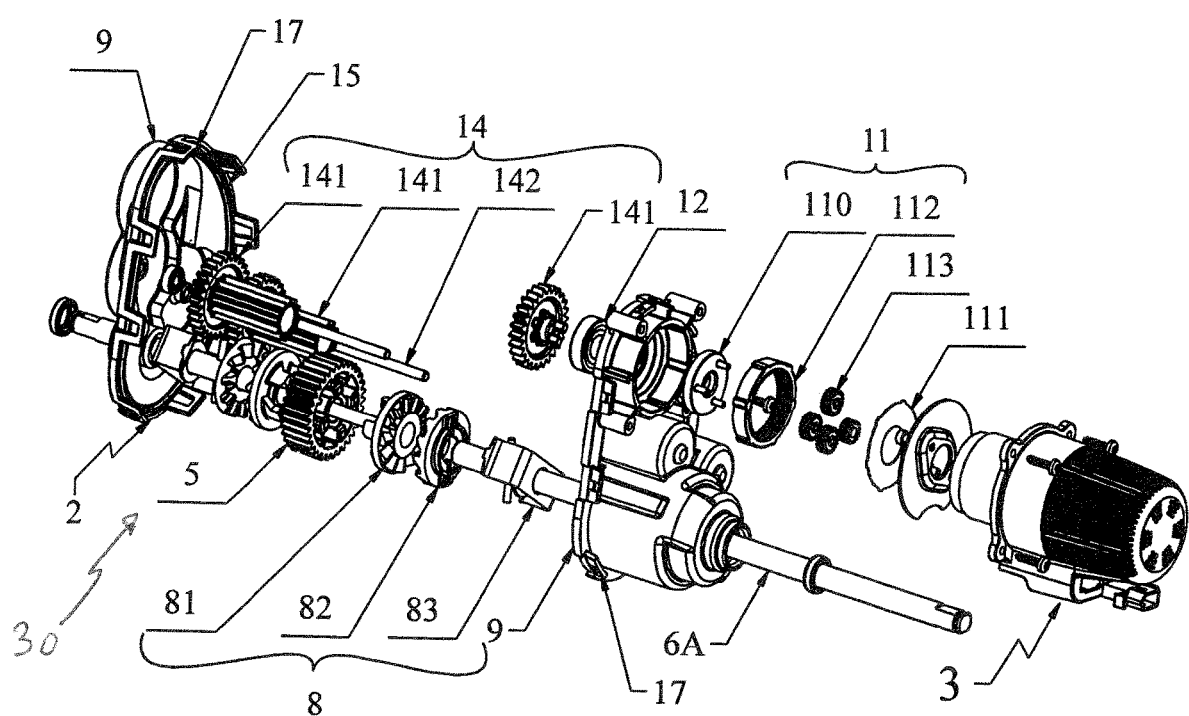
FIG. 3A shows elements constituting a transmission housing in accordance with the invention in an exploded position.
Figure 3B:
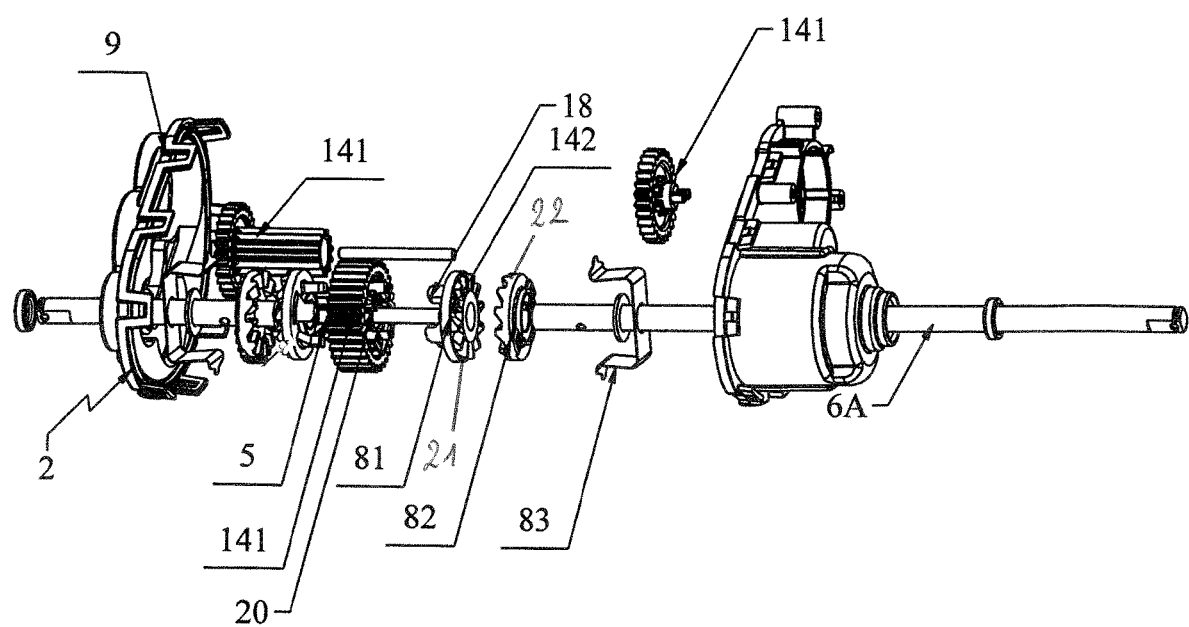
FIG. 3B is a fragmentary view in an exploded position showing elements mounted on the wheel drive shaft.

In the example shown in FIG. 3B, the toothed wheel constituting the driven member 5 presents on each of its faces a ring of teeth in which each tooth has two flanks parallel to the axis of rotation of the wheel drive shaft, each flank being connected to the tip of the tooth by a cut-off corner.

On its face facing towards the driven member 5, the clutch plate 81 has a ring of teeth with each tooth having a flank parallel to the axis of rotation of the wheel drive shaft sections and a sloping flank forming an angle with said axis of rotation.

The sloping flank is formed by the ramp given reference 18 in the figures. This flank is the flank that is stressed during forward drive of the driven member 5 by coming into bearing contact with a tooth of the driven member 5 in order to cause the clutch plate to move axially away from the driven member 5.

The other face of the plate, i.e. its face that faces towards the part 82 that is constrained to rotate with the wheel drive shaft section, constituted in this example by a ramped wheel, comprises in the same manner a ring of teeth having flanks, one straight and the other sloping.

The part 82 or wheel that is constrained to rotate with the wheel drive shaft section also includes a ring of teeth, in which each tooth presents one flank that slopes and the other flank that is straight.

During forward drive of the driven member 5 with the clutch plate 81 being in its state spaced apart from the driven member 5, for each tooth of the plate 81 and of the part 82, a straight flank of a tooth of the plate co-operates with a straight flank of a tooth of the part 82 that is constrained to rotate with the wheel drive shaft section.

This co-operation by bearing contact continues so long as the rotary drive speed of the wheel drive shaft section is not faster than the speed of the driven member 5. When the wheel rotary drive speed becomes faster than the speed of rotation of the driven member 5, e.g. during a turn for the wheel of the shaft forming the wheel on the outside of said turn, the drive shaft section and its part 82 become driving, such that each tooth of the part 82 co-operates via its ramp-forming sloping flank 22 by bearing contact against the ramp-forming sloping flanks 21 of the teeth of the clutch plate, so as to cause the clutch plate to move axially towards the driven member 5 as far as a position in which said ramps are decoupled, corresponding to the deactivated state of the clutch mechanism.

In order to enable optimal operation of this clutch mechanism, the clutch plate 81 is braked using a brake 83. The brake 83 is a friction brake member that acts by continuous bearing contact against the outer peripheral edge face of the clutch plate 81.

The brake 83 of the or each clutch mechanism 8 comprises two spring blades 831 extending along the wheel drive shaft 6 or the wheel drive shaft section 6A; 6B associated with said clutch mechanism 8 and a connection zone 832 for connecting said spring blades 831 together. Said spring blades 831 are mounted about the shaft 6 or the wheel drive shaft section 6A, 6B so as to be stationary in rotation, and in diametrically opposite manner relative to the drive shaft 6 or said wheel drive shaft section 6A, 6B, and said connection zone 832, arranged at or in the vicinity of one of the ends of the spring blades 831, is provided with a through orifice 833 to enable said brake 83 to be threaded on the wheel drive shaft 6 or on the wheel drive shaft section 6A, 6B associated with said clutch plate 81.

In other words, the brake of the plate is mounted about the wheel drive shaft section associated with said plate so as to be stationary in rotation. The brake of the plate is generally U-shaped with the branches of the U-shape extending along the wheel drive shaft section associated with said plate and the end wall of the U-shape provided with a through orifice to enable said brake to be threaded on the wheel drive shaft section associated with said plate.

The brake of the plate is formed by a folded and cut sheet. This results in said brake being simple to manufacture.

In order to be mounted stationary in rotation, the spring blades are bent back at their free ends so as to form tongues suitable for sliding in an axial groove 19 of the housing.

As mentioned above, all of the above-described means are housed at least in part inside the housing 2.

It should be recalled that the terms "comprise" or "comprising" do not exclude other elements or steps.

The invention claimed is:

1. A transmission and transmission housing for said transmission,
   the transmission including two housing elements that can be positioned to press against each other and that in the assembled-together state define: a cavity; a shaft projecting at least in part from the housing; a motion transmission mechanism for transmitting motion to said shaft, the motion transmission mechanism being housed at least in part inside the cavity of the housing; and sealing means arranged in the zone where the housing elements are pressed together and referred to as a join plane, the sealing means surrounding said cavity,
   wherein the housing comprises:
   means for connecting the housing elements together by snap-fastening in order to hold the housing elements pressed against each other and in that the sealing means comprise adhesive connection means for connecting said housing elements together,
   wherein the housing is a transmission housing of a wheeled vehicle, and in that the shaft that projects at least in part from the housing is a wheel drive shaft for driving the wheels of a single pair of wheels of the vehicle, the wheel drive shaft being made as a single part, or else as at least two wheel drive shaft sections on a common axis, each suitable for driving a respective wheel of a single pair of wheels of the vehicle, the drive shaft passing transversely through said join plane when the two housing elements are in the assembled-together state.

2. The transmission and transmission housing according to claim 1, wherein the adhesive connection means include a channel referred to as the "main" channel for receiving adhesive, which main channel is peripheral, surrounding said cavity and being arranged between two "auxiliary"

channels each running parallel to the main channel in the assembled-together state of said housing elements.

3. The transmission and transmission housing according to claim 1, wherein the adhesive connection means include a channel referred to as the "main" channel for receiving adhesive surrounding said cavity, and at least one "auxiliary" channel running parallel to the main channel in the assembled-together state of said housing elements.

4. The transmission and transmission housing according to claim 2, wherein said peripheral main channel comprises a groove, carried by one housing element and a rib, carried by the other housing element, with a male element being engaged at least in part in a female element in the assembled-together state of said housing elements.

5. The transmission and transmission housing according to claim 1, wherein the sealing means further comprise a gasket placed at the join plane in at least one of the housing elements.

6. The transmission and transmission housing according to claim 1, wherein the means for connecting the housing elements together by snap-fastening comprise a plurality of elastically deformable members extending over the periphery of one of the housing elements, said elastically deformable members being suitable for co-operating by coming to engage with the complementary members carried by the other housing element when the housing elements are pressed against each other.

7. The transmission and transmission housing according to claim 6, wherein the means for connecting the housing elements together by snap-fastening comprise a plurality of recesses in the form of loops arranged around the periphery of one of the housing elements in order to form said plurality of elastically deformable members and a plurality of lugs arranged around the periphery of the other housing element in order to form said complementary members, each lug being suitable for being inserted in a loop when the housing elements are pressed against each other.

8. The transmission and transmission housing according to claim 1, wherein the mechanism for transmitting motion to said wheel drive shaft comprises: motor drive means, comprising a motor having a driven motor shaft extending parallel to the longitudinal axis of the wheel drive shaft; a toothed wheel, that is permanently engaged with the motor drive means for rotating said driven member, and arranged between the wheel drive shaft or each of the wheel drive shaft sections of said shaft and the driven member; a clutch mechanism, the or each clutch mechanism being activated by driving the driven member in rotation in a first rotary drive direction referred to as the "forward" direction, and being deactivatable by driving the shaft or the wheel drive shaft section with which it co-operates in rotation in the forward direction when the speed of rotation of the shaft or of said wheel drive shaft section is greater than the speed of rotation of the driven member; the wheel drive shaft or each wheel drive shaft section being, in the deactivated state of the corresponding clutch mechanism, free to rotate in either direction of rotation.

9. A method of closing the transmission housing of claim 1, wherein the sealing means has adhesive connection means, said method comprising:

a step of placing adhesive on the join plane of at least one of the housing elements, a step of applying said housing elements against each other, and a step of holding said housing elements pressed against each other by means of snap-fastening connection means fitted on said housing elements so as to hold the housing elements pressed against each other until the adhesive has set.

10. A wheeled vehicle fitted with a transmission and transmission housing, the vehicle having the transmission housing is according to claim 1.

11. The transmission and transmission housing according to claim 1, wherein the drive shaft extends orthogonally through said join plane when the two housing elements are in the assembled-together state.

\* \* \* \* \*